United States Patent
Han

(12) 
(10) Patent No.: US 6,615,788 B2
(45) Date of Patent: Sep. 9, 2003

(54) PISTON ASSEMBLY FOR AN INTERNAL COMBUSTION ENGINE

(76) Inventor: Geum T. Han, 290-39 DaeHwa-dong, DaeDuk-ku, DaeJeon (KR), 306-020

( * ) Notice: Subject to any disclaimer, the term of this patent is extended or adjusted under 35 U.S.C. 154(b) by 0 days.

(21) Appl. No.: 10/086,821

(22) Filed: Mar. 4, 2002

(65) Prior Publication Data

US 2003/0101958 A1 Jun. 5, 2003

(30) Foreign Application Priority Data

Jul. 30, 2001 (KR) .................................. 2001-0046024

(51) Int. Cl.[7] ............................................... F02F 75/06
(52) U.S. Cl. .................................................. 123/193.6
(58) Field of Search ................ 123/193.6; 92/172–260; 277/138, 435

(56) References Cited

U.S. PATENT DOCUMENTS

| | | | | |
|---|---|---|---|---|
| 4,045,036 A | * | 8/1977 | Shunta | 277/138 |
| 4,522,412 A | * | 6/1985 | Kubo | 277/138 |
| 4,629,200 A | * | 12/1986 | Ruddy | 277/216 |
| 5,651,553 A | * | 7/1997 | Ishda et al. | 277/136 |
| 5,737,999 A | * | 4/1998 | Ariga | 123/193.6 |
| 5,743,171 A | * | 4/1998 | Ariga | 92/208 |
| 6,213,474 B1 | * | 4/2001 | Sameshima et al. | 277/434 |
| 6,257,590 B1 | * | 7/2001 | Kumai et al. | 277/435 |

FOREIGN PATENT DOCUMENTS

KR 20010046024 7/2001

* cited by examiner

*Primary Examiner*—Marguerite McMahon
(74) *Attorney, Agent, or Firm*—Park & Sutton LLP; John K. Park

(57) ABSTRACT

A mechanism for sealing gaps between a piston assembly and a cylinder for an internal combustion engine is provided. A sealing member inserted into an upper wall of a groove holding the oil ring to block a gap between them. The oil ring has two rails on its outer periphery. The upper rail is radially bigger than the lower rail and conforms better to the shape of the cylinder. The oil ring has a recess on its inner periphery to hold a pressing member that forces the oil ring against the cylinder. The recess is extended beyond the pressing member to provide a larger contact area between the oil ring and the groove.

20 Claims, 8 Drawing Sheets

PISTON ASSEMBLY FOR AN INTERNAL COMBUSTION ENGINE

CLAIMING FOREIGN PRIORITY

The applicant claims and requests a foreign priority, through the Paris Convention for the Protection of Industry Property, based on a patent application filed in the Republic of Korea (South Korea) with the filing date of Jul. 30, 2001, with the application number 2001-0046024, by the applicant. (See the Attached

BACKGROUND OF THE INVENTION

The present invention relates to a piston assembly for an internal combustion engine. More particularly, the invention relates to a piston assembly for an internal combustion engine which prevents air from an air source for an internal combustion engine like an air cleaner or a turbo charger from leaking into the inside of the piston assembly and prevents lubrication oil leak from a crankcase into a combustion chamber of the engine thereby reducing lubrication oil loss and incomplete combustion.

An internal combustion engine comprises one or more cylinders and pistons, which move reciprocally in the cylinders. For example, as shown in. FIG. 1, a two-cycle internal combustion engine includes a piston assembly 10, and a cylinder liner 12, which surround the piston assembly 10, and fits into a cylinder (not shown). In the middle part of the cylinder and between the cylinder liner 12, is formed an air intake port 14.

The piston assembly 10 includes a piston 16, a plurality of grooves 18 formed at the outer periphery of the upper part of the piston 16, compression rings 17 inserted into the grooves 18 to keep sealing between the piston 16 and the cylinder liner 12. The Piston assembly 10 has also two grooves 20, 22 formed at the outer periphery of the lower part of the piston 16, an oil ring 24 inserted into the groove 22 and another oil ring, or an oil scraper ring 26 inserted into the groove 20, which is positioned above the groove 22.

The oil ring 24 collects lubrication oil and returns it to the crankcase of the engine. The oil-scraping ring 26 scrapes down lubrication oil spread on the cylinder liner 12. The entire outer periphery or a portion of the periphery of the oil scraping ring 26 contacts the cylinder liner 12, and adjusts the thickness of the lubrication oil film by scraping down excess oil. An oil passage 28 is formed between the grooves 20, 22 to communicate the inside of the piston 16 and the gap between the outer cylindrical wall of the piston 16 and the inner wall of the cylinder liner 12.

FIGS. 2 through 4 show the oil scraper ring 26. The oil scraper ring 26 has an upper rail 30 and a lower rail 32. Diameters of the rails are the same. A plurality of evenly spaced scallops 34 is formed on the lower rail 32. The scallops 34 pass the oil collected by the upper rail 30 to the crankcase via the oil passage 28.

At down stroke of the piston's reciprocal movement, air pressure builds up within the space confined by the inside of the piston, the cylinder, and the crankcase. The pressure forces some oil from the inside of the piston 16 to be leaked into the gap between the cylinder liner 12 or the inner wall of the cylinder and the piston 16. The leaked oil eventually reaches the air intake port 14 and flows into the combustion chamber causing incomplete combustion.

The cause of this phenomenon is explained referring to FIG. 5. While a semi-vacuum state is formed in the space below the piston at upstroke of the piston's reciprocal movement, at down stroke, a portion of air flowing in via the air intake port 14 passes through a gap between the cylinder liner 12 and the oil scraper ring 26, or through a gap between the oil scraper ring 26 and the groove 20. The leaked air flows into the inside of the piston 16 via the scallops 34 and the oil passage 28. As the piston 16 moves down further, the air in the space below the piston 16 is compressed to increase the air pressure within the space. The increased pressure causes a reverse air flow via the path explained above. This reverse flow forces oil spread on the cylinder liner 12 or on the outer wall of the piston 16 to be sprayed onto the portion of the cylinder liner 12 near the air intake port 14. The sprayed oil is flowed into the combustion chamber together with the intake air and burned together with the fuel.

Since the ignition point of oil is higher than that of fuel, such combustion of the mixture of oil and fuel causes incomplete combustion, reduction of combustion efficiency, excessive consumption of fuel, and exhausting smoke. Another problem is that the pressure buildup hinders down stroke movement of the piston, and causes engine efficiency drop or noise. Still another problem is excessive consumption of lubrication oil due to the combustion of the leaked oil.

Such problems are inherent to the construction of an oil ring, a cylinder, and a cylinder liner of prior art. The portion of the cylinder around the air intake port is machined to have an increasing size considering thermal expansion. However, since the diameters of the rails of the oil-scraping ring are the same, when the piston is at the top dead point or at down stroke, the lower rail 32 contacts the cylinder liner but the upper rail 30 does not contact the cylinder liner. Therefore, a gap is formed between the cylinder liner and the oil-scraping ring, providing a leakage path.

Accordingly, there has been a demand for an improved sealing mechanism between an oil ring of a piston assembly and a cylinder liner of an internal combustion engine.

SUMMARY OF THE INVENTION

The present invention is contrived to overcome the conventional disadvantages. Therefore, an object of the invention is to provide an enhanced sealing mechanism for a piston assembly for an internal combustion engine.

Another object of the invention is to prevent air leak into the inside of the piston assembly.

Still another object of the invention is to prevent oil leak into a combustion chamber of the engine.

Still another object of the invention is to prevent excessive pressure buildup in a crankcase of the engine.

Still another object of the invention is to prevent formation of gaps around the oil ring in its assembled state.

To achieve the above-described objects, in accordance with an embodiment thereof, the invention provides a piston assembly for an internal combustion engine comprising a piston that has a shape of a cylinder and has an outer cylindrical wall and a top portion on one end of the cylinder; an oil ring that is pressed against a cylinder liner of the internal combustion engine; and a circular groove that is formed in the outer cylindrical wall of the piston and holds the oil ring. The groove has an upper wall, a sidewalk, and a lower wall and the upper wall is positioned toward the too portion of the piston. The piston assembly further includes a circular recess that is formed in the upper wall of the groove and a sealing member that is inserted into the recess and contacts the oil ring.

The sealing member may be an elastic member and in the assembled state within the circular groove, the sealing member is compressed to provide sealing between the groove and the oil ring. Preferably, the sealing member is an O-ring.

In accordance with another embodiment thereof, the invention provides a piston assembly for an internal combustion engine comprising a piston that has a shape of a cylinder and has an outer cylindrical wall and a top portion on one end of the cylinder, an oil ring that has an upper projection and a lower projection that are formed on an outer periphery of the oil ring, a circular groove that is formed in the outer cylindrical wall of the piston and holds the oil ring.

The upper projection of the oil ring is positioned toward the top portion of the piston. Both of the projections of the oil ring have tapered edges, and the outer diameter of the upper projection is greater than the outer diameter of the lower projection.

The groove has an upper wall, a sidewall, and a lower wall and the upper wall is positioned toward the top portion of the piston. The piston assembly further includes a circular recess that is formed in the upper wall of the groove and a sealing member that is inserted into the recess and contacts the oil ring.

Preferably, the difference between the outer diameters of the upper projection and the lower projection is from about 0.2 cm to about 0.6 cm. More preferably, the difference is about 0.4 cm.

Preferably, the thickness of the edge of the upper projection is greater than the thickness of the edge of the lower projection.

In accordance with another embodiment thereof, the invention provides a piston assembly for an internal combustion engine comprising a piston that has a shape of a cylinder and has an outer cylindrical wall and a top portion on one end of the cylinder, an oil ring, and a circular groove that is formed in the outer cylindrical wall of the piston and holds the oil ring.

The oil ring has an outer periphery, an inner periphery, a top portion, a bottom portion, a recess that is formed along the inner periphery, an upper edge that connects the top portion and the recess, a lower edge that connects the bottom portion and the recess, and an elastic member that is inserted into to the recess of the oil ring and presses the oil ring against a cylinder liner of the internal combustion engine. The radii of the upper and lower edges of the oil ring are less than the inner radius of the elastic member.

Preferably, the difference between the radii of the upper and lower edges of the oil ring and the inner radius of the elastic member of the oil ring is about 0.5 mm.

The advantages of the present invention are numerous in that: (1) oil leak or air leak through a gap between the oil ring and the groove holding the oil ring is prevented by the sealing member provided at the recess in the groove's wall; (2) the sealing between the oil ring and the groove is further enhanced with the extended upper and lower edges of the oil ring; and (3) oil leak or air leak through a gap between the piston assembly and the cylinder liner is prevented by the upper and lower projections of the oil ring wherein the diameter of the upper projection is bigger than that of the lower projection and the edge of the upper projection is thicker than the edge of the lower projection.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
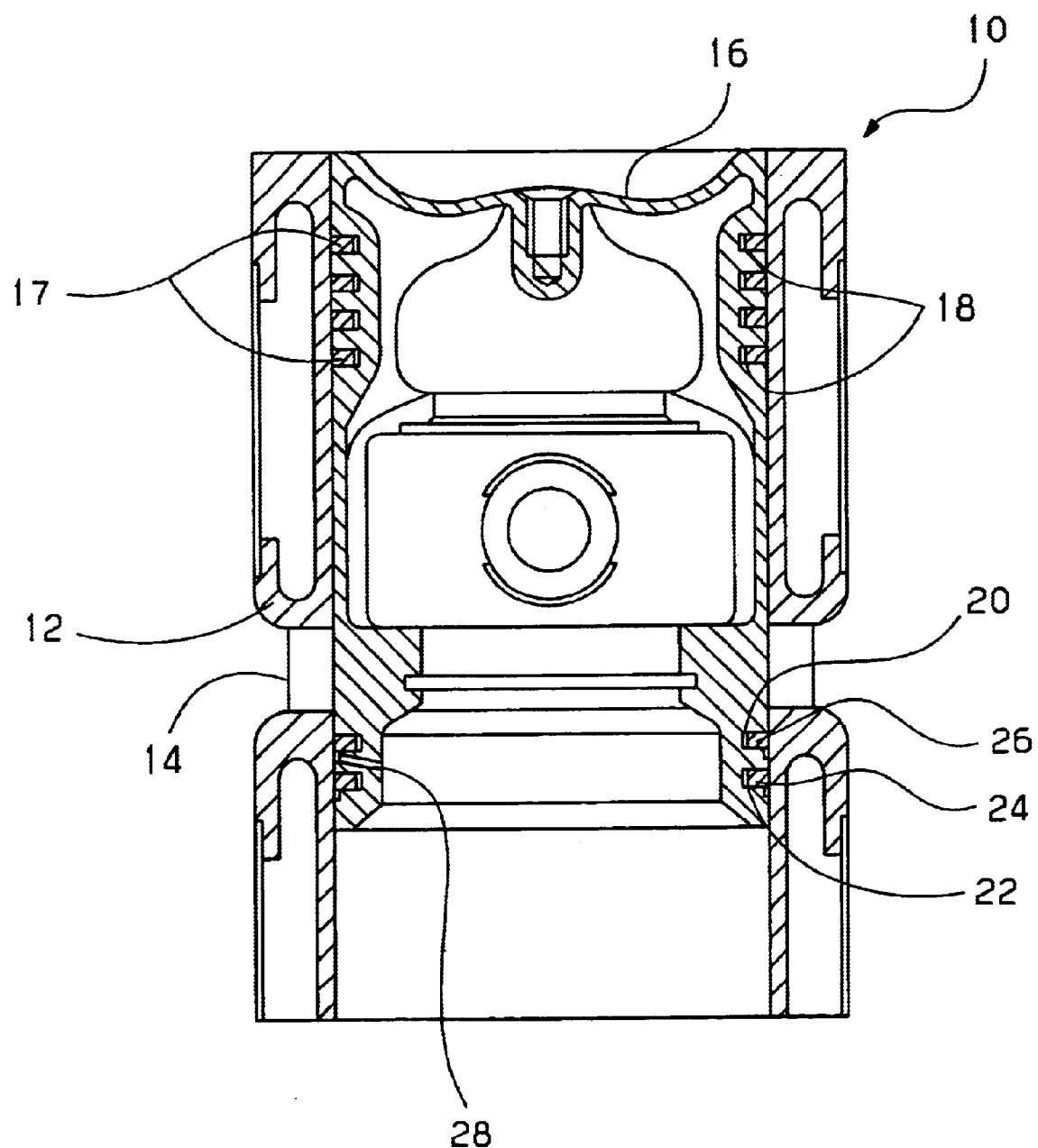
FIG. 1 is a cross-sectional view showing a piston assembly and a cylinder liner by prior art.
Figure 2:
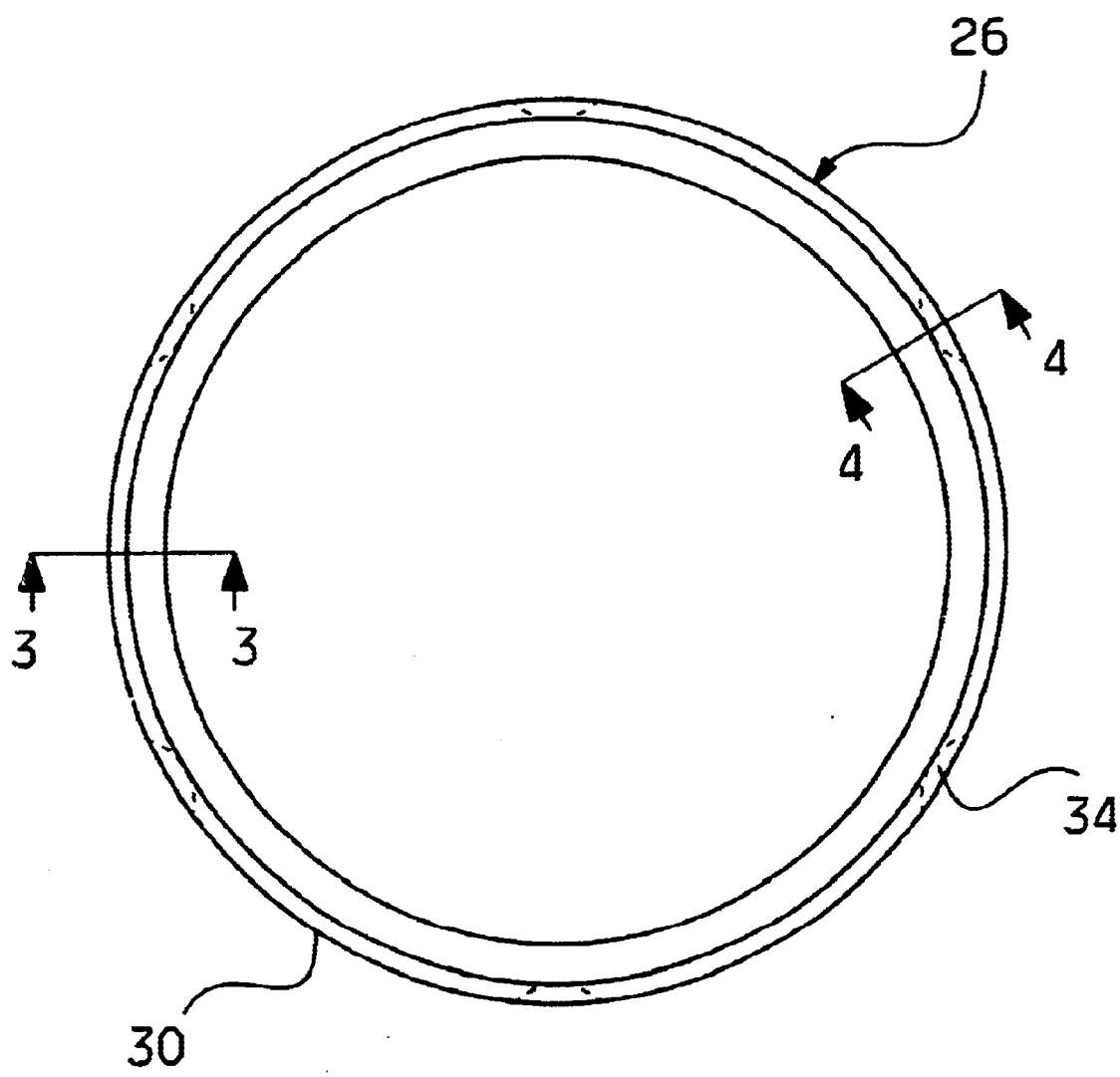
FIG. 2 is a plan view of an oil ring by prior art.
Figure 3:
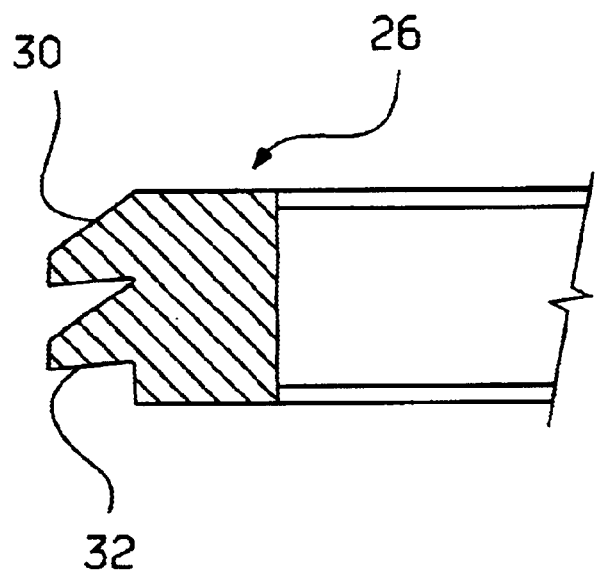
FIG. 3 is a cross-sectional view taken along 3—3 in FIG. 2.
Figure 4:
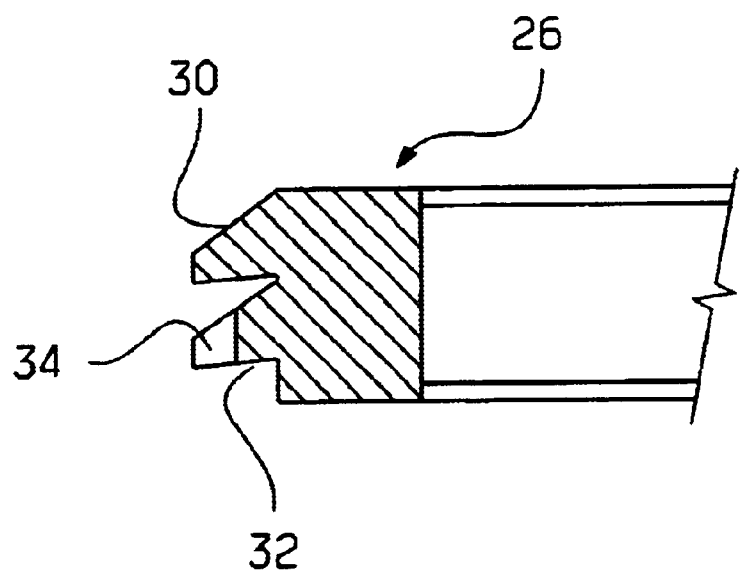
FIG. 4 is a cross-sectional view taken along 4—4 in FIG. 2.
Figure 5:
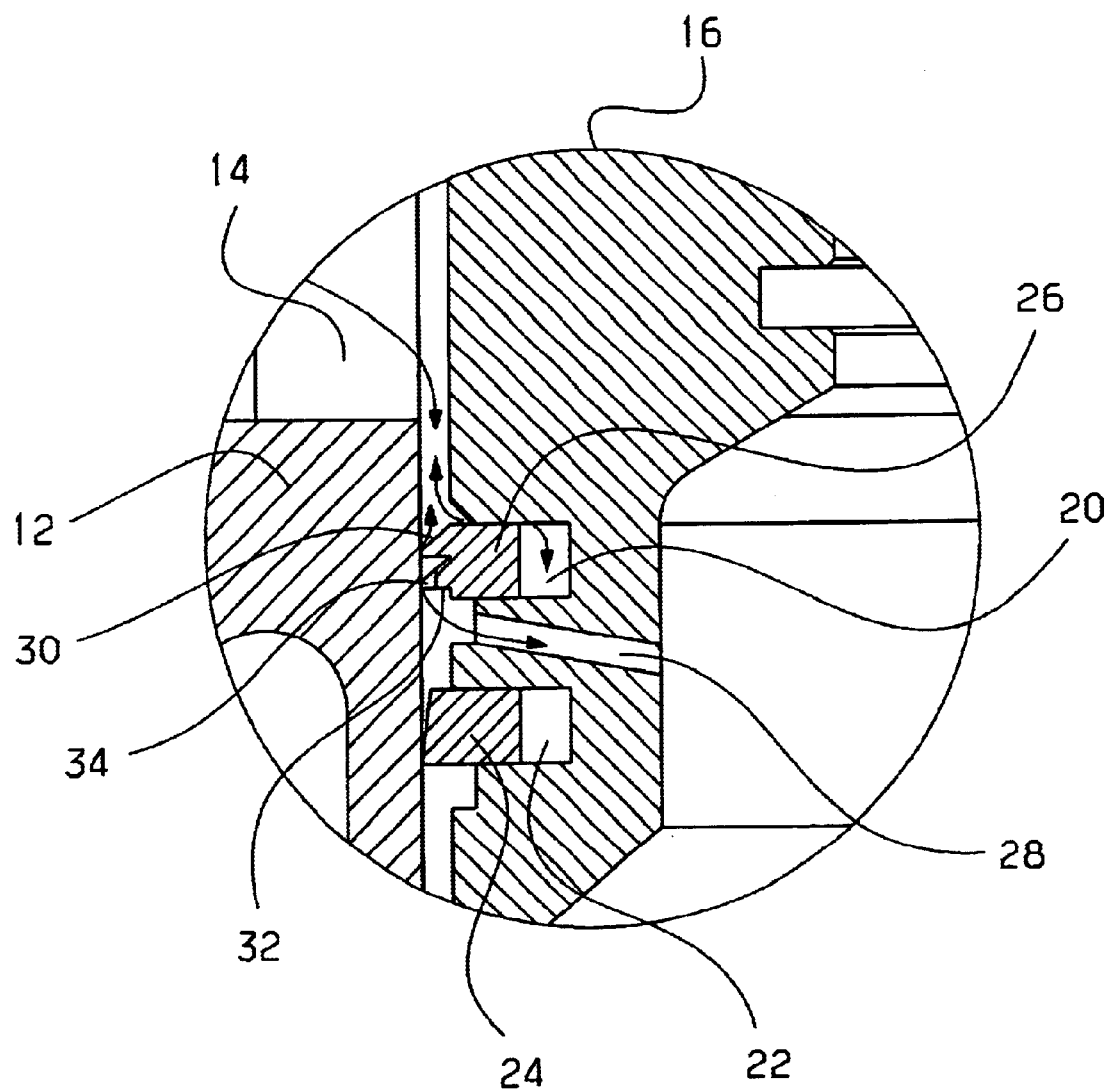
FIG. 5 is a cross-sectional view showing a piston, oil rings, and a cylinder liner by prior art.
Figure 6:
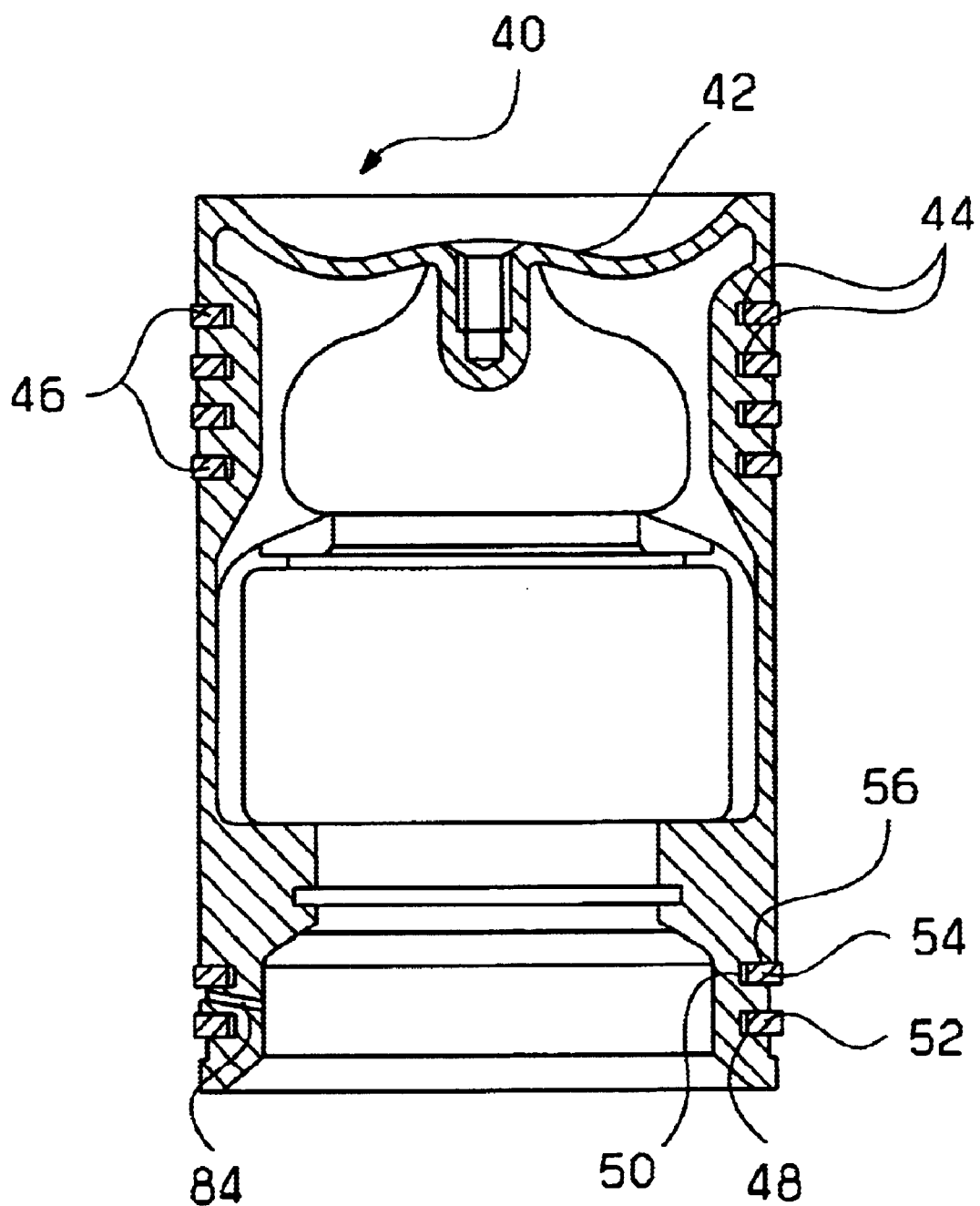
FIG. 6 is a cross-sectional view showing a piston assembly according to the present invention.

As shown in FIG. 6, a piston assembly 40 for an internal combustion engine according to the present invention includes a piston 42, a plurality of grooves 44 formed at an outer periphery of the upper part of the piston 42, compression rings 46 inserted into the grooves 44 to keep sealing between the piston 42 and a cylinder liner. The piston assembly 40 further has two grooves 48, 50 formed at an outer periphery of the lower part of the piston 42, an oil ring 52 inserted into the groove 48 and another oil ring, or an oil scraper ring 54 inserted into the groove 50, which is positioned above the groove 48.

Figure 7:
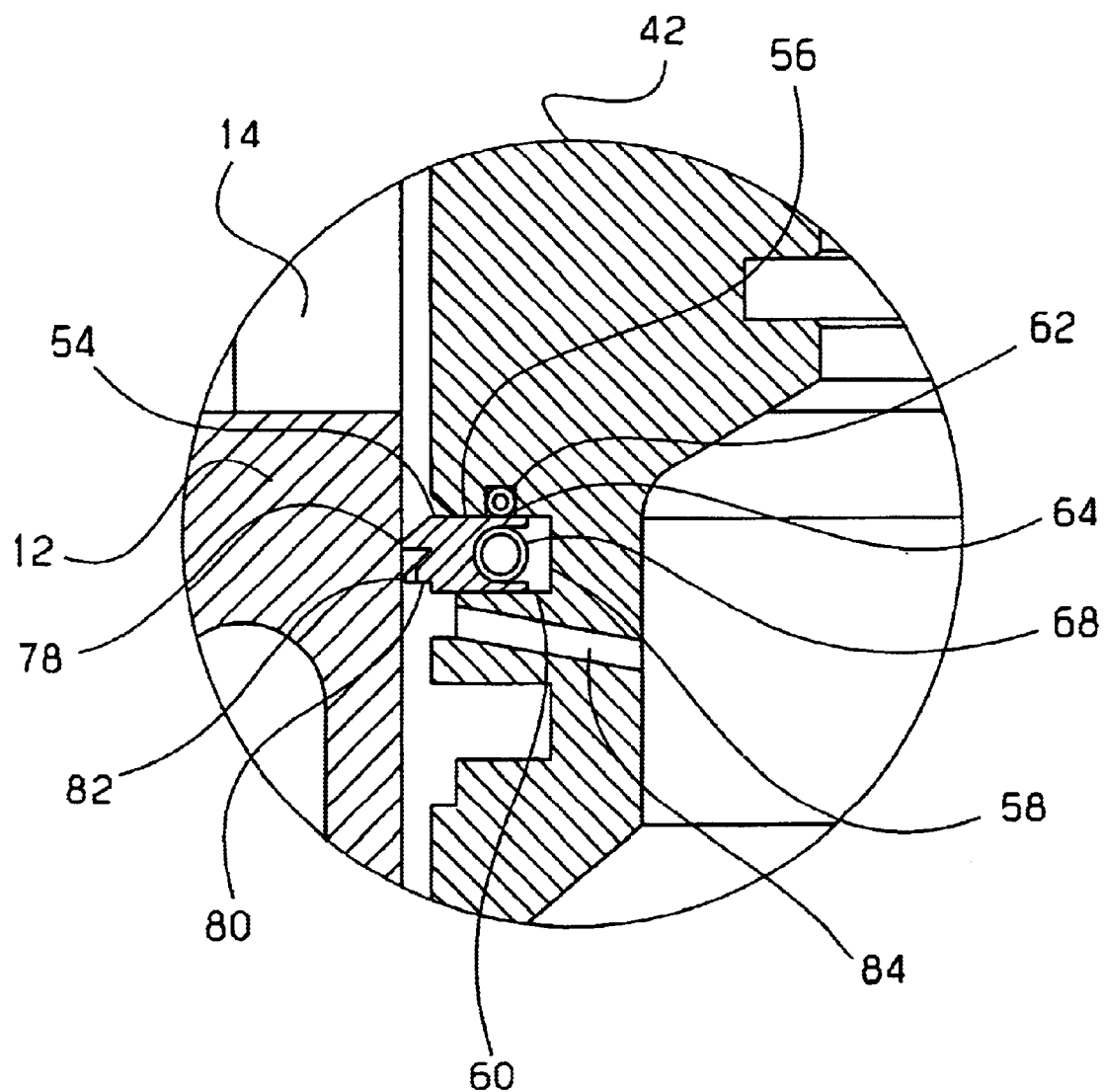
FIG. 7 is a cross-sectional view showing a piston, an oil ring, and a cylinder liner according to the resent invention.

As shown in FIG. 7, the groove 50 holding oil ring 54 has an upper wall 56, a sidewall 58, and a lower wall 60. A circular recess 62 is formed on the upper wall 56 of the groove 50. A sealing member 64 is inserted into the recess 62 such that it should contact the oil ring 54. The sealing member 64 blocks a gap between the upper wall 56 of the groove 50 and an upper surface of the oil 10 ring 54, and provides a tight seal eliminating leak of oil or air. The sealing member 64 is made of elastic material so that it is compressed against an upper surface of the oil ring 54.

The sealing member 64 is preferably, an O-ring.

Figure 8:
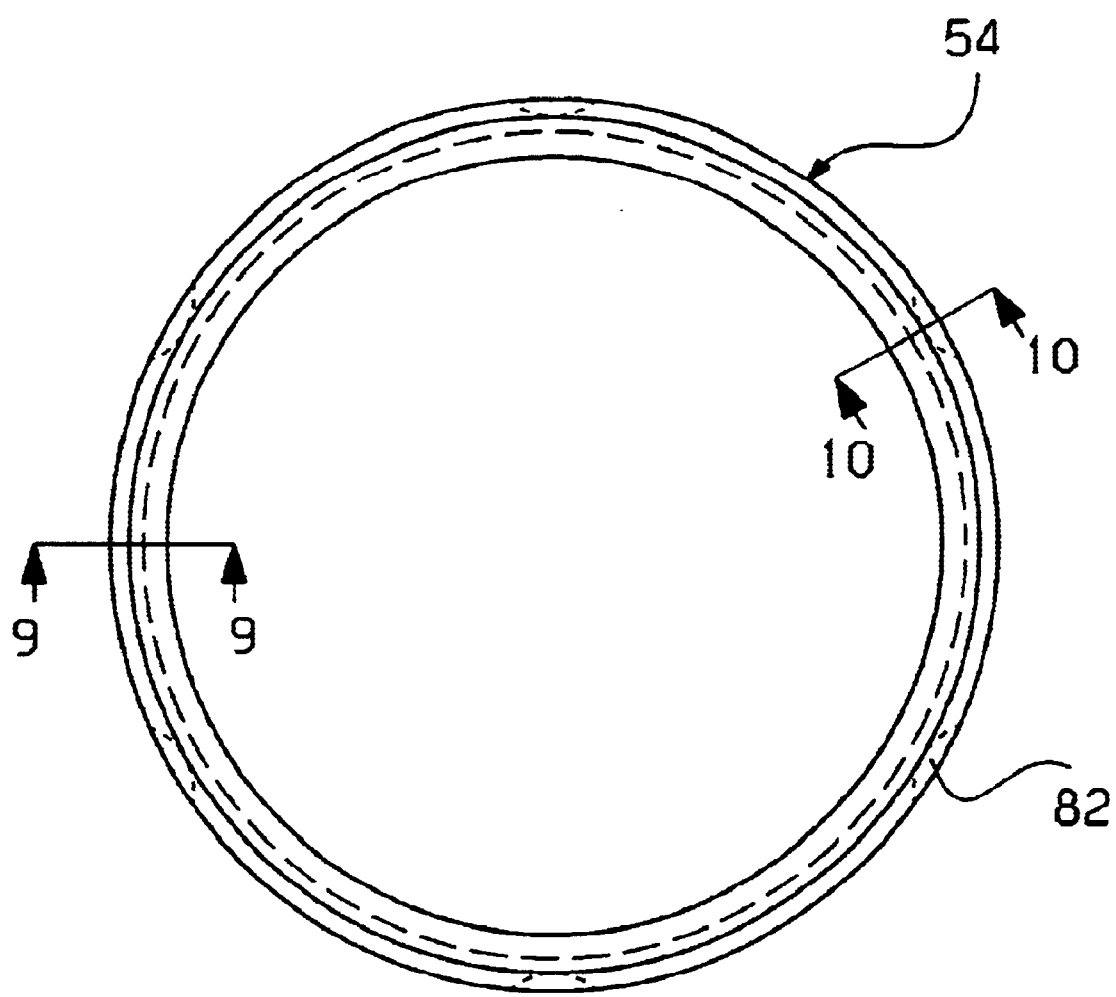
FIG. 8 is a plan view showing an oil ring according to the present invention.
Figure 9:
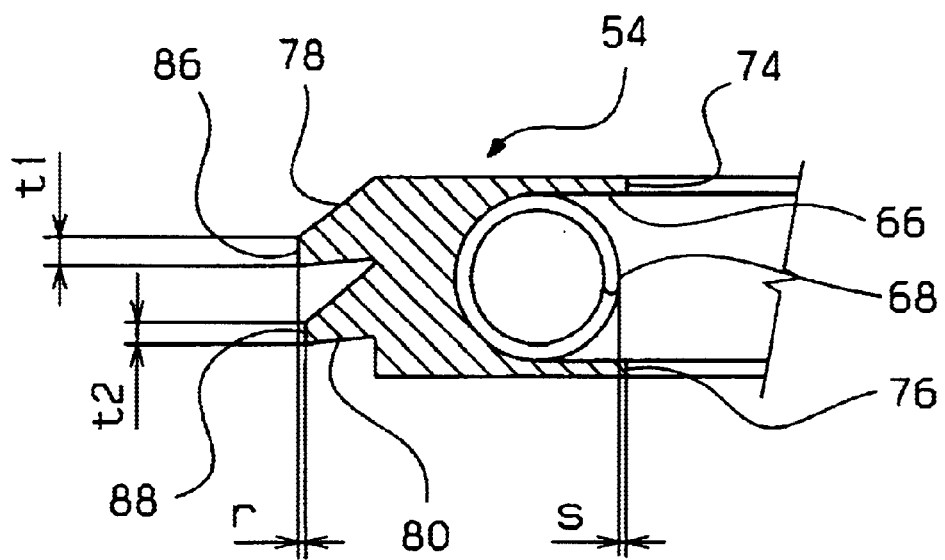
FIG. 9 is a cross-sectional view taken along 9—9 in FIG. 7.
Figure 10:
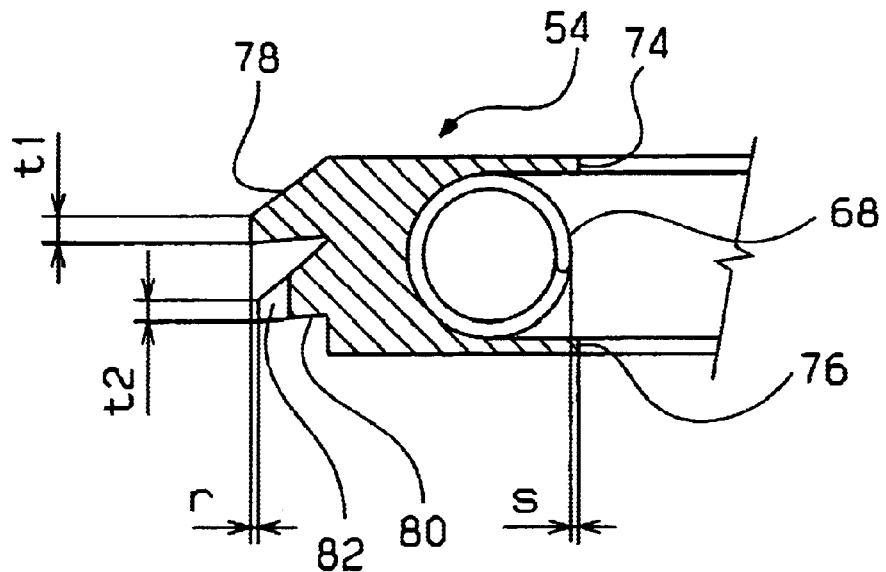
FIG. 10 is a cross-sectional view taken along 10—10 in FIG. 7.

FIGS. 8–10 show the oil ring 54 in detail. A recess 66 is formed along an inner periphery of the oil ring 54. An elastic member or pressing member 68 is inserted into the recess 66 to force the oil ring 54 radially outward, that is, toward the cylinder liner 12. The pressing member 68 is formed of a coil spring. Since the pressing member 68 presses an outer periphery of the oil ring 54 against the cylinder liner, the outer periphery of the oil ring tightly contacts the cylinder liner and a gap between them is eliminated. The oil ring 54 further has a top portion 70, a bottom portion 72, an upper edge 74 connecting the top portion 70 and the recess 66, and a lower edge 76 connecting the bottom portion 72 and the recess 66. The recess 66 is extended to the edges 74, 76 such that the radii of the edges are less than the inner radius of the pressing member 68. All of the radii are measured from the center of the oil ring 54. This increases the area that the oil ring 54 contacts the groove 50 thereby enhancing sealing effect. Preferably, the difference s between the radii of the edges and the inner radius of the pressing member is 0.5 mm.

The oil ring 54 further has an upper projection or rail 78 and a lower projection or rail 80 formed on the outer periphery of the oil ring. The outer diameter of the upper rail 78 is greater than that of the lower rail 80. A plurality of evenly-spaced scallops 82 are formed on a periphery of the lower rail 80 to pass oil scraped by the upper rail 78 to a crankcase via an oil passage 84 positioned between the grooves 48, 50. The upper rail 78 is tapered and has an edge 86 at the end of the taper. The lower rail 80 is tapered and has an edge 88 at the end of the taper.

The upper rail 78 is formed bigger than the lower rail 80 considering that the portion of the cylinder around the air intake port is machined to have an increasing size to compensate thermal expansion. Preferably, the difference r between the outer diameters of the upper rail 78 and the lower rail 80 is in the range from 0.2 cm to 0.6 cm, and more preferably about 0.4 cm. Accordingly, the difference between the radius of the edge 86 of the upper rail 78 and the radius of the edge 88 of the lower rail 80 is in the range from 0.1 cm to 0.3 cm, and more preferably about 0.2 cm. The radii are measured from the center of the oil ring 54. The thickness t1 of the edge 86 of the upper rail 78 is preferably greater than the thickness t2 of the edge 88 of the lower rail 80.

With the above construction, the air supplied from an air cleaner or a.turbo charger via the air intake port is prevented from leaking into the inside of the piston 42. The air flowing between the cylinder liner and the piston assembly 40 is prevented from leaking into the inside of the piston assembly via a gap between the oil ring 54 and the groove 50 because the sealing member 64 seals the gap. The sealing of the gap is further enhanced by the increased contact area of the oil ring 54 and the groove 50 that is provided by the extended edges 74, 76 of the oil ring 54.

In addition, because the pressing member 68 forces the oil ring 54 against the cylinder liner and the upper rail 78 has a bigger diameter than that of the lower rail 80, a gap between the oil ring 54 and the cylinder liner is eliminated. This prevents air from leaking into the inside of the piston assembly via the gap.

The sealing effects above apply equally for the oil leak into the combustion chamber of an internal combustion engine since the oil leak occurs in reverse paths for the air leak.

Since air leak into the inside of the piston assembly is prevented, buildup of air pressure during down stroke is relieved, and the air pressure inside the piston or inside the cylinder is kept at a suitable level. The reduced air pressure in turn, reduces oil leak.

Consequently, the down stroke movement of the piston assembly becomes smoother; the lubrication oil consumption is reduced; and air pollution due to incomplete combustion is reduced.

Although the invention has been described in considerable detail, other versions are possible by converting the aforementioned construction. Therefore, the scope of the invention shall not be limited by the specification specified above and the appended claims.

What is claimed is:

1. A piston assembly for an internal combustion engine having a cylinder liner comprising:
    a) a piston having a shape of a cylinder, the piston having an outer cylindrical wall and a top portion on one end of the cylinder;
    b) an oil ring, the oil ring being pressed against the cylinder liner;
    c) a circular groove formed in the outer cylindrical wall of the piston, the groove holding the oil ring, the groove having an upper wall, a sidewall, and a lower wall, the upper wall being positioned toward the top portion of the piston;
    d) a circular recess formed in the upper wall of the groove; and
    e) a sealing member being inserted into the recess, the sealing member contacting the oil ring.

2. The piston assembly of claim 1 wherein the sealing member is an O-ring.

3. The piston assembly of claim 1 wherein the sealing member is elastic.

4. The piston assembly of claim 3 wherein the sealing member is compressed.

5. The piston assembly of claim 1 wherein the oil ring has an outer periphery, an inner periphery, a top portion, a bottom portion, a recess being formed along the inner periphery, an upper edge connecting the top portion and the recess, a lower edge connecting the bottom portion and the recess, and an elastic member being inserted into the recess of the oil ring and pressing the oil ring against the cylinder liner.

6. The piston assembly of claim 5 wherein the radii of the upper and lower edges of the oil ring are less than the inner radius of the elastic member.

7. The piston assembly of claim 6 wherein the difference between the radii of the upper and lower edges of the oil ring and the inner radius of the elastic member of the oil ring is about 0.5 mm.

8. A piston assembly for an internal combustion engine having a cylinder liner comprising:
    a) a piston having a shape of a cylinder, the piston having an outer cylindrical wall and a top portion on one end of the cylinder;
    b) an oil ring having an outer periphery and an upper projection and a lower projection, the projections being formed on the outer periphery, the upper projection being positioned toward the top portion of the piston, the projections having tapered edges, the outer diameter of the upper projection being greater than the outer diameter of the lower projection;
    c) a circular groove formed in the outer cylindrical wall of the piston, the groove holding the oil ring, the groove having an upper wall, a sidewall, and a lower wall, the upper wall being positioned toward the top portion of the piston;
    d) a circular recess formed in the upper wall of the groove; and
    e) a sealing member being inserted into the recess, the sealing member contacting the oil ring.

9. The piston assembly of claim 8 wherein the difference between the outer diameters of the upper projection and the lower projection is from about 0.2 cm to about 0.6 cm.

10. The piston assembly of claim 9 wherein the difference between the outer diameters of the upper projection and the lower projection is about 0.4 cm.

11. The piston assembly of claim 8 wherein the thickness of the edge of the upper projection is greater than the thickness of the edge of the lower projection.

12. The piston assembly of claim 8 wherein the sealing member is an O-ring.

13. The piston assembly of claim 8 wherein the sealing member is elastic.

14. The piston assembly of claim 13 wherein the sealing member is compressed.

15. A piston assembly for an internal combustion engine having a cylinder liner comprising:
   a) a piston having a shape of a cylinder, the piston having an outer cylindrical wall and a top portion on one end of the cylinder;
   b) an oil ring having an outer periphery, an inner periphery, a top portion, a bottom portion, a recess being formed along the inner periphery, an upper edge connecting the top portion and the recess, a lower edge connecting the bottom portion and the recess, and an elastic member being inserted into the recess of the oil ring and pressing the oil ring against the cylinder liner, the radii of the upper and lower edges of the oil ring are less than the inner radius of the elastic member; and
   c) a circular groove formed in the outer cylindrical wall of the piston, the groove holding the oil ring.

16. The piston assembly of claim 15 wherein the difference between the radii of the upper and lower edges of the oil ring and the inner radius of the elastic member of the oil ring is about 0.5 mm.

17. The piston assembly of claim 15 wherein the oil ring further has an upper projection and a lower projection being formed on the outer periphery; the upper projection is positioned toward the top portion of the piston; the projections have tapered edges; and the outer diameter of the upper projection is greater than the outer diameter of the lower projection.

18. The piston assembly of claim 17 wherein the difference between the outer diameters of the upper projection and the lower projection is from about 0.2 cm to about 0.6 cm.

19. The piston assembly of claim 18 wherein the difference between the outer diameters of the upper projection and the lower projection is about 0.4 cm.

20. The piston assembly of claim 17 wherein the thickness of the edge of the upper projection is greater than the thickness of the edge of the lower projection.

* * * * *